(12) United States Patent
Kim

(10) Patent No.: US 10,604,099 B2
(45) Date of Patent: Mar. 31, 2020

(54) AIR BAG DOOR FOR VEHICLE

(71) Applicant: HYUNDAI MOBIS CO., LTD., Seoul (KR)

(72) Inventor: Young Jun Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 68 days.

(21) Appl. No.: 16/015,161

(22) Filed: Jun. 21, 2018

(65) Prior Publication Data

US 2019/0126877 A1 May 2, 2019

(30) Foreign Application Priority Data

Oct. 31, 2017 (KR) .................. 10-2017-0144332

(51) Int. Cl.
*B60R 21/205* (2011.01)
*B60R 21/215* (2011.01)
*B29L 31/30* (2006.01)

(52) U.S. Cl.
CPC .......... *B60R 21/205* (2013.01); *B60R 21/215* (2013.01); *B29L 2031/3038* (2013.01)

(58) Field of Classification Search
CPC .......... B60R 21/23138; B60R 21/0428; B60R 21/01544; B60R 21/013; B60R 21/21; B60R 2021/0246; B60J 5/0487
See application file for complete search history.

(56) References Cited

U.S. PATENT DOCUMENTS

| | | | |
|---|---|---|---|
| 2004/0164531 A1* | 8/2004 | Riha | B29C 59/16 280/732 |
| 2004/0232668 A1* | 11/2004 | DePue | B60R 21/205 280/732 |
| 2005/0127641 A1* | 6/2005 | Cowelchuk | B60R 21/216 280/728.3 |
| 2007/0007753 A1* | 1/2007 | Williams | B60R 21/217 280/728.2 |
| 2010/0102541 A1* | 4/2010 | Shimizu | B60R 21/201 280/728.3 |
| 2012/0126514 A1* | 5/2012 | Choi | B60R 21/215 280/728.3 |
| 2018/0272983 A1* | 9/2018 | Mazzocchi | B60R 21/215 |

FOREIGN PATENT DOCUMENTS

KR 10-2013-0048867 5/2013

* cited by examiner

*Primary Examiner* — Darlene P Condra
(74) *Attorney, Agent, or Firm* — H.C. Park & Associates, PLC

(57) ABSTRACT

An airbag door for a vehicle including: a suit case installed in an instrument panel; a door panel coupled to the suit case so as to cover an opening of the suit case; and a scrim member coupled to the door panel so as to support the door panel deployed from the suit case, and fixed to the suit case.

6 Claims, 7 Drawing Sheets

AIR BAG DOOR FOR VEHICLE

CROSS-REFERENCES TO RELATED APPLICATION

This application claims priority from and the benefit of Korean Patent Application No. 10-2017-0144332, filed on Oct. 31, 2017, which is hereby incorporated by reference for all purposes as if set forth herein.

BACKGROUND

Field

Exemplary embodiments relate to an airbag door for a vehicle, and more particularly, to an airbag door for a vehicle, which can prevent a damage and separation of a scrim constituting a hinge part during a manufacturing process, thereby improving the durability and stability of products.

Discussion of the Background

In general, a vehicle has an airbag module installed therein, the airbag module serving to protect a driver or passenger in case of a collision.

In particular, a passenger airbag module is installed in an instrument panel in front of a passenger seat. A passenger airbag door must be deployed when shock is applied from outside. Therefore, the instrument panel has a cut groove formed at a portion corresponding to the edge of the passenger airbag door, the cut groove being formed through a scoring process using laser or various processing methods. Such a cut groove is formed so as not to be seen from outside, in consideration of the exterior beauty of the instrument panel.

The related art of the present invention is disclosed in Korean Patent Publication No. 2013-0048867 published on May 13, 2013 and entitled "Passenger airbag door and method for manufacturing the same".

The technology is a related art for promoting understandings of the present invention, and does not indicate a related art which is widely known in the art to which the present invention pertains.

In the related art, a coupling force between a scrim and a door panel which constitute the airbag door may be reduced, and a connection portion of the scrim, exposed through the door panel, may be easily damaged.

Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention provide an airbag door for a vehicle, which can improve a coupling force between a scrim member and a door panel in order to prevent a separation of the scrim member and a damage of a connection portion of the scrim member, thereby improving the durability and stability of products.

Additional features of the invention will be set forth in the description which follows, and in part will be apparent from the description, or may be learned by practice of the invention.

In one embodiment, an airbag door for a vehicle may include: a suit case installed in an instrument panel; a door panel coupled to the suit case so as to cover an opening of the suit case; and a scrim member coupled to the door panel so as to support the door panel deployed from the suit case, and fixed to the suit case. The door panel may be coupled to the scrim member and then insert-injection-molded on the suit case.

The door panel may be coupled to the suit case in order to prevent contact between the scrim member and the suit case.

The door panel may be divided based on a hinge part of the scrim member, and insert-injection-molded in the suit case so as to protect the hinge part.

The door panel may include: a cover plate for sealing the opening; and a protection plate coupled to the suit case so as to protect the scrim member.

The scrim member may have one end portion coupled to the cover plate and the other end portion coupled to the protection plate.

The scrim member may include a first fixing part insert-injection-molded on the cover plate and a second fixing part insert-injection-molded on the protection plate.

The scrim member may include a hinge part positioned between the cover plate and the protection plate, and supporting the deployment of the door panel.

The scrim member may be insert-injection-molded on the door panel such that the hinge part is exposed to the outside of the door panel.

The coupling portion between the door panel and the hinge part may be exposed to the outside of the suit case.

The protection plate may include a scrim contact prevention part to prevent contact between the hinge part and the suit case.

The scrim contact prevention part may protrude to the outside of the suit case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
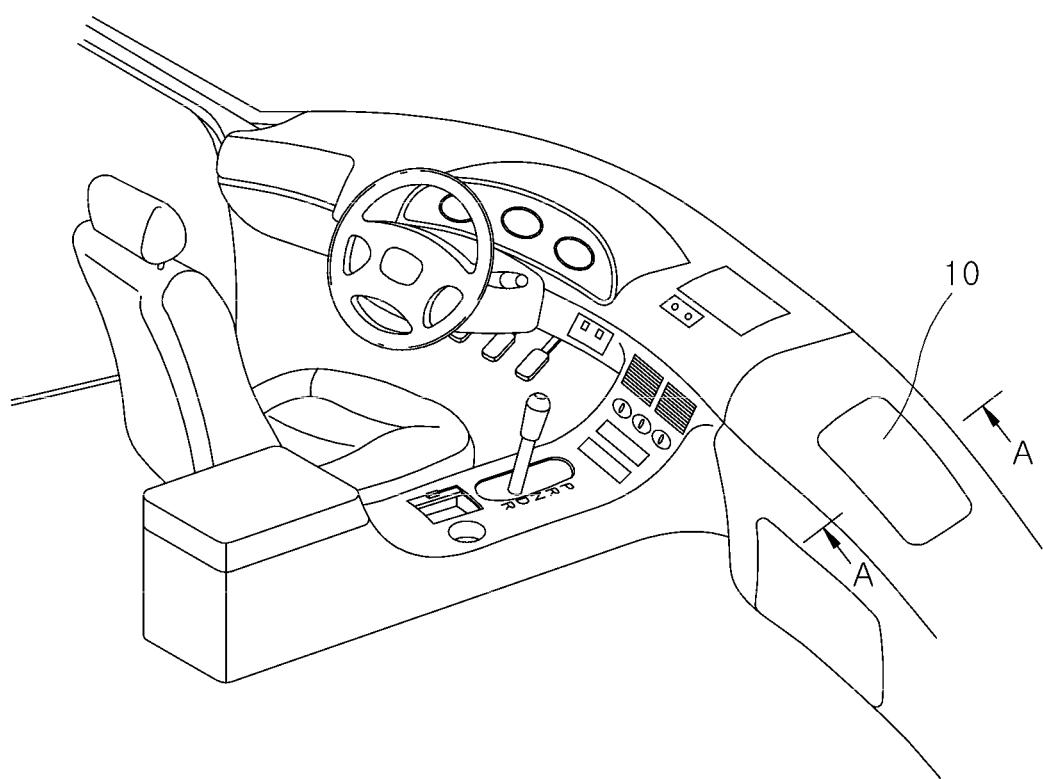
FIG. 1 illustrates an instrument panel of a vehicle.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
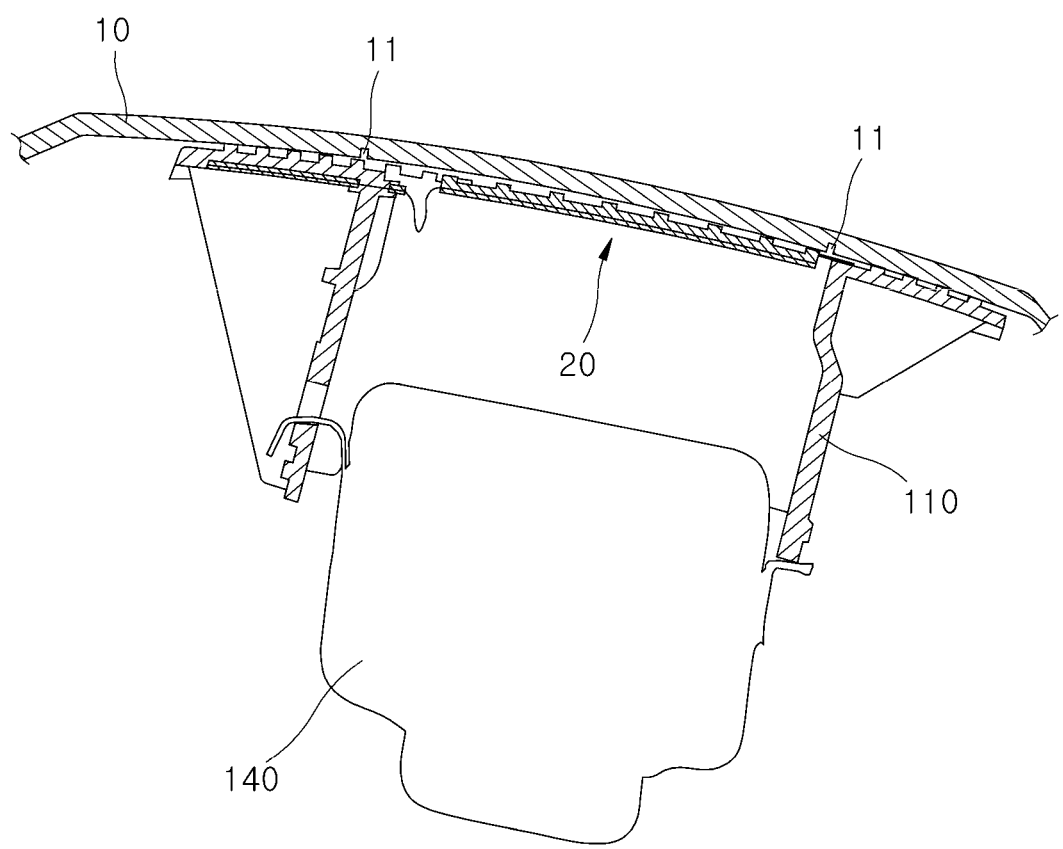
FIG. 2 is a cross-sectional view taken along the line A-A of FIG. 1.
Figure 3:
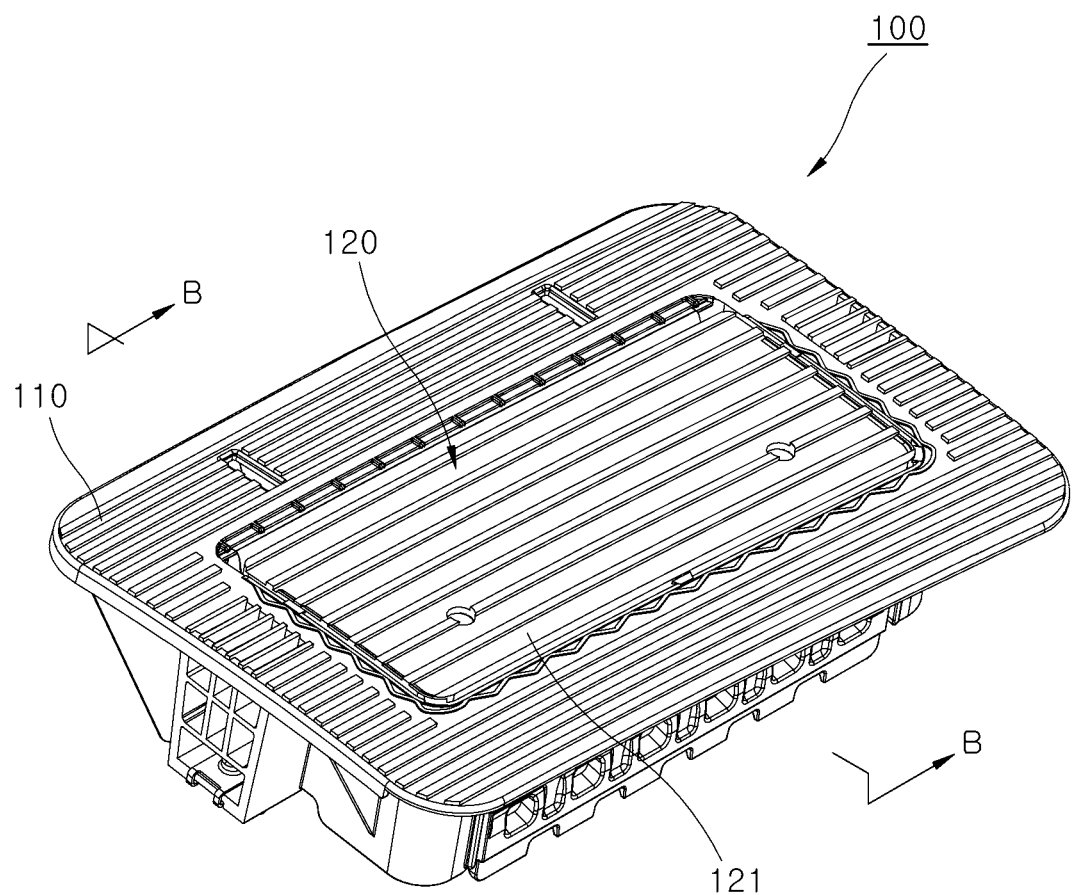
FIG. 3 is a perspective view illustrating an airbag door for a vehicle in accordance with an embodiment of the present invention.
Figure 4:
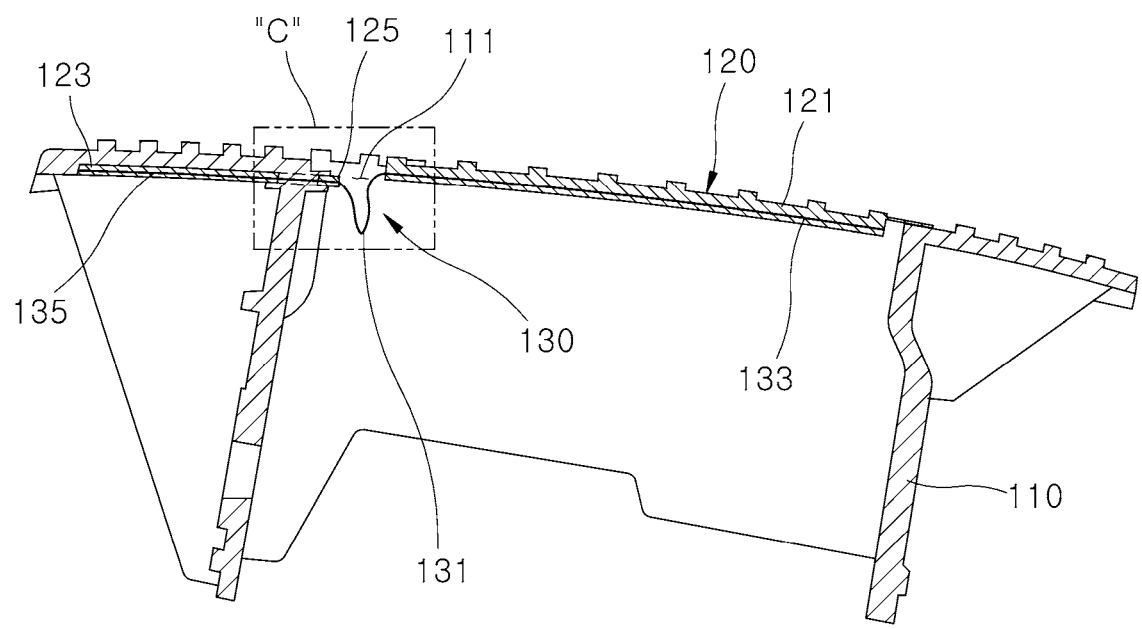
FIG. 4 is a cross-sectional view taken along the line B-B of FIG. 3.

FIG. 1 illustrates an instrument panel of a vehicle, FIG. 2 is a cross-sectional view taken along the line A-A of FIG. 1, FIG. 3 is a perspective view illustrating an airbag door for a vehicle in accordance with an embodiment of the present invention, and FIG. 4 is a cross-sectional view taken along the line B-B of FIG. 3.

Figure 5:
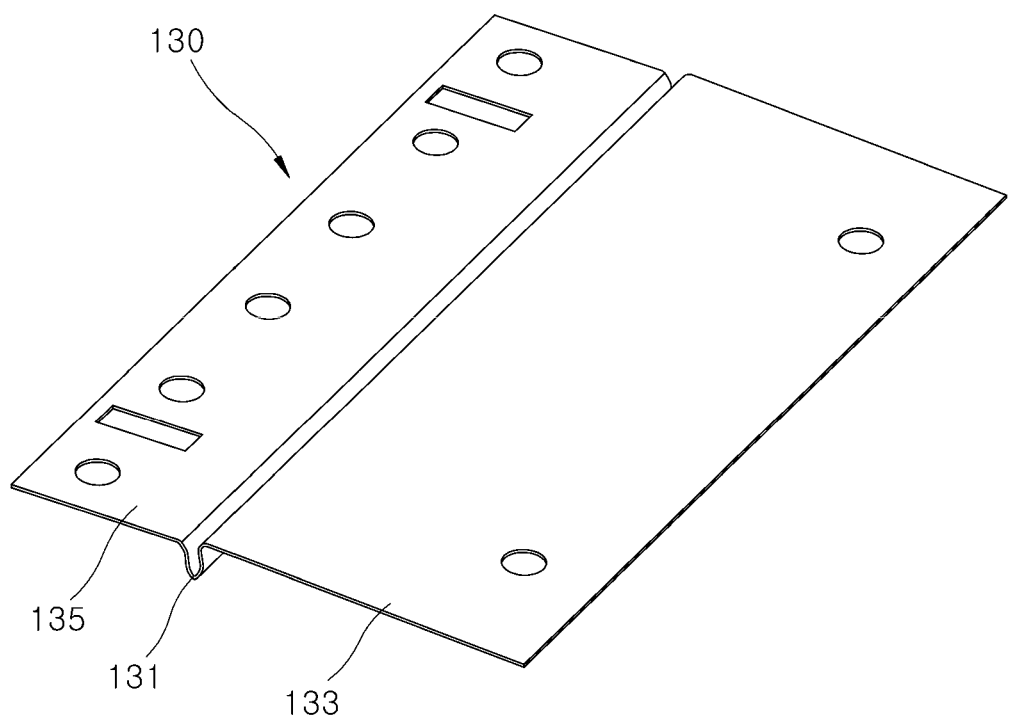
FIG. 5 is a perspective view illustrating a scrim member in accordance with the embodiment of the present invention.
Figure 6:
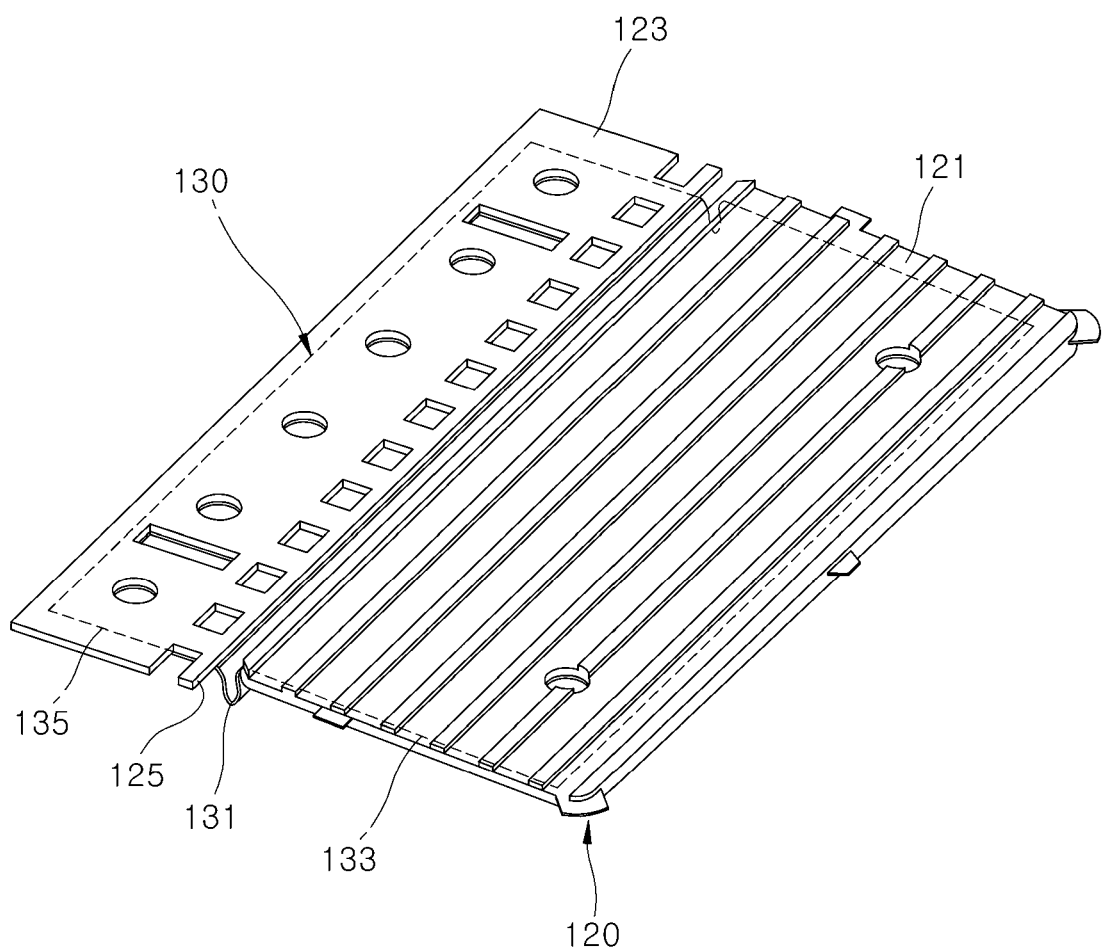
FIG. 6 is a perspective view illustrating a door panel and the scrim member in accordance with an embodiment of the present invention.
Figure 7:
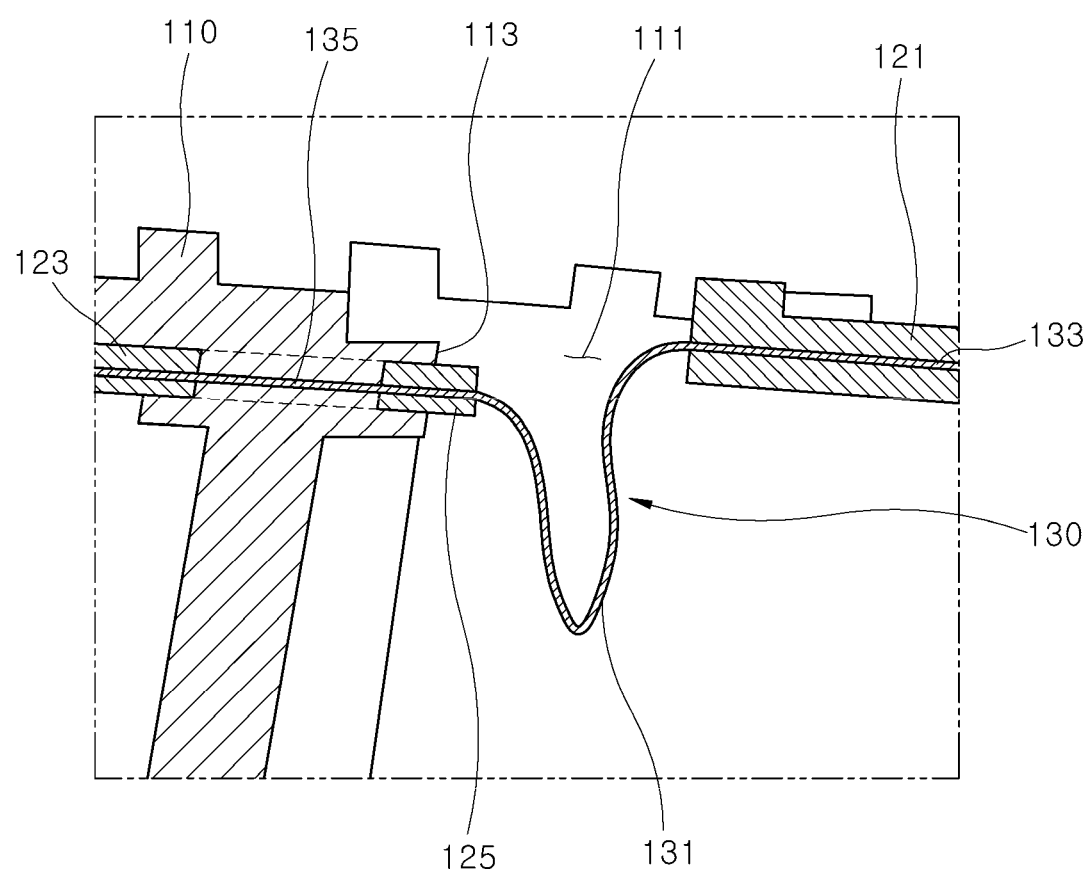
FIG. 7 is an expanded view of a portion C in FIG. 4.

FIG. 5 is a perspective view illustrating a scrim member in accordance with the embodiment of the present invention, FIG. 6 is a perspective view illustrating a door panel and the scrim member in accordance with an embodiment of the present invention, and FIG. 7 is an expanded view of a portion C in FIG. 4.

Referring to FIGS. 1 to 4, the airbag door 100 for a vehicle in accordance with the embodiment of the present invention may include a suit case 110, a door panel 120, a scrim member 130 and an airbag 140.

The suit case 110 may be installed at the bottom of an instrument panel 10 of the vehicle. The suit case 110 may be fixed to the instrument panel 10 through a vibration welded rib by a vibration welding process. In addition, an opening 111 for deployment of the airbag 140 may be formed in the center of the suit case 110, and covered by the door panel 120.

The suit case 110 in accordance with the present embodiment may include TPO (Thermoplastic Olefin) or PPF (Poly Propylene Fumarate).

The door panel 120 may be coupled to the suit case 110 so as to cover the opening 111 of the suit case 110. The door panel 120 may be fixed to the instrument panel 10 through a vibration welded rib by a vibration welding process.

When the airbag 140 is deployed through the opening 111, the door panel 120 may be rotated and opened to the outside of the instrument panel 10 while the instrument panel 10 is cut by the deployment pressure of the airbag 140. At this time, the instrument panel 10 may have a cut line 11 formed at a portion corresponding to the edge of the door panel 120, such that the door panel 120 can be rapidly and accurately rotated and opened.

In particular, the door panel 120 may be supported and rotated by the scrim member 130, a separation of the door panel 120 from the suit case 110 may be prevented by the scrim member 130, and the scrim member 130 and the suit case 110 may be coupled at a stable and accurate position through the door panel 120.

For this structure, the door panel 120 may include a cover plate 121 and a protection plate 123. The door panel 120 may be coupled to the scrim member 130, and then coupled to the suit case 110 so as to seal the opening 111.

For example, the door panel 120 may be injection-molded in such a manner that the scrim member 130 is inserted, and then insert-injection-molded in the suit case 110.

The cover plate 121 may be positioned in the opening 111 so as to cover the opening 111 of the door panel 120, and connected to the protection plate 123 by the scrim member 130. That is, the cover plate 121 may be connected to the protection plate 123 with the scrim member 130 interposed therebetween. When the airbag 140 is deployed, the cover plate 121 may be rotated in the suit case 110 by the deployment pressure of the airbag 140, thereby uncovering the opening 111.

The protection plate 123 may prevent the door panel 120 from coming in contact with a parting line 113 of the suit case 110, when the door panel 120 is insert-injection-molded in the suit case 110. This structure can prevent the scrim member 130 from being damaged by the parting line 113. The protection plate 123 may be insert-injection-molded so as to be inserted into the suit case 110, and prevent the movement of the scrim member 130 when resin is injected into a mold in order to injection-mold the suit case 110.

In particular, the protection plate 123 may include a scrim contact prevention part 125 for protecting the scrim member 130 exposed to the outside of the suit case 110. The scrim contact prevention part 125 may be exposed to the inside of the opening 111 of the door panel 120, and prevent resin from leaking from the mold through the scrim member 130 when the suit case 110 is injection-molded. Such a structure can prevent an excessive occurrence of burrs on the parting line 113 of the suit case 110, which makes it possible to prevent a damage of the scrim member 130 when the cover plate 121 is opened.

In the present embodiment, the door panel 120 may include TPO (Thermoplastic Olefin).

Referring to FIGS. 5 to 7, the scrim member 130 may rotatably connect the cover plate 121 of the door panel 120 to the suit case 110, and may be fixed to the suit case 110 through the protection plate 123 of the door panel 120.

The scrim member 130 may fix the cover plate 121 to the suit case 110 when the airbag 140 is deployed. Therefore, the cover plate 121 may uncover the opening 111 while being rotated in the opening 111.

The scrim member 130 may have one end portion coupled to the cover plate 121 and the other end portion coupled to the protection plate 123, and a hinge part 131 may be installed between the cover plate 121 and the protection plate 123. Specifically, the scrim member 130 may include a first fixing part 133 insert-injection-molded on the cover plate 121 and a second fixing part 135 insert-injection-molded on the protection plate 123, and the hinge part 131 may be formed between the first and second fixing parts 133 and 135.

The hinge part 131 may prevent a separation of the cover plate 121 from the suit case 110 when the airbag 140 is deployed in a high-temperature state. One end of the hinge part 131 may be exposed at the scrim contact prevention part 125 of the protection plate 123, and the other end of the hinge part 131 may be exposed at the cover plate 121.

The scrim member 130 in accordance with the present embodiment may include polyester or nylon. Thus, although the cover plate 121 is rapidly rotated and opened, the scrim member 130 can be prevented from being torn at the hinge part 131 connected to the scrim contact prevention part 125.

Hereafter, the operation of the airbag door for a vehicle in accordance with the embodiment of the present invention will be described as follows.

When a shock such as collision occurs outside the vehicle, the airbag door 100 may be deployed to the outside of the suit case 110 while the airbag 140 of the suit case 110 is expanded. At this time, while the cut line 11 of the instrument panel 10 is torn by the pressure of the expanded and deployed airbag 140, the cover plate 121 may be rotated outward at the opening 111 of the suit case 110.

When the cover plate 121 is opened in the opening 111, the cover plate 121 may be rotated while being supported by the hinge part 131 of the scrim member 130. Therefore, since the cover plate 121 is prevented from being unstably opened or separated from the suit case 110, the airbag 140 may be stably expanded and deployed.

In the airbag door 100 for a vehicle in accordance with the embodiment of the present invention, both end portions of the scrim member 130 may be insert-injection-molded on the cover plate 121 and the protection plate 123 of the door panel 120 based on the hinge part 131, and the door panel 120 may be coupled to the suit case 110 through insert injection molding.

Furthermore, in the airbag door 100 for a vehicle in accordance with the embodiment of the present invention, the suit case 110 may be injection-molded with the scrim member 130 stably fixed through the door panel 120. Thus, when the suit case 110 is injection-molded, the scrim member 130 can be prevented from moving in the mold, which makes possible to fix the scrim member 130 and the hinge part 131 at accurate positions of the suit case 110.

Furthermore, since the hinge part 131 of the scrim member 130 is supported by the protection plate 123, the connection portion of the hinge part 131 can be prevented from being damaged by contact with the suit case 110 when the suit case 110 is injection-molded, which makes it possible to improve the durability and stability of products.

Furthermore, since a separate mold pin for fixing the scrim member 130 does not need to be installed when the door panel 120 is insert-injection-molded in the suit case 110, the workability of the manufacturing process can be improved.

In accordance with the embodiments of the present invention, the hinge part constituting the scrim member may be coupled to an accurate position of the suit case through the door panel.

Furthermore, since the hinge part is coupled to the suit case by the door panel, it is possible to prevent a damage of the connection portion of the hinge part by contact with the suit case.

Furthermore, since a damage of the hinge part can be prevented, the durability and stability of products can be improved.

Furthermore, since the scrim member does not need to be fixed when the scrim member is insert-injection-molded in the suit case, the workability of the manufacturing process can be improved.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An airbag door for a vehicle, comprising:
   a suit case installed in an instrument panel;
   a door panel coupled to the suit case so as to cover an opening of the suit case; and
   a scrim member coupled to the door panel so as to support the door panel deployed from the suit case, and fixed to the suit case,
   wherein:
   the door panel is coupled to the scrim member and then insert-injection-molded on the suit case;
   the door panel is coupled to the suit case in a manner that prevents contact between the scrim member and the suit case;
   the door panel comprises:
      a cover plate configured to seal the opening; and
      a protection plate coupled to the suit case so as to protect the scrim member;
   the scrim member comprises a hinge part positioned between the cover plate and the protection plate, and configured to support the deployment of the door panel; and
   the protection plate comprises a scrim contact prevention part configured to prevent contact between the hinge part and the suit case.

2. The airbag door of claim 1, wherein the scrim member comprises a hinge part, the door panel is divided based on the hinge part, and the door panel is insert-injection-molded in the suit case so as to protect the hinge part.

3. The airbag door of claim 1, wherein the scrim member has a first end portion coupled to the cover plate and a second end portion coupled to the protection plate.

4. The airbag door of claim 1, wherein the scrim member comprises a first fixing part insert-injection-molded on the cover plate and a second fixing part insert-injection-molded on the protection plate.

5. The airbag door of claim 1, wherein the scrim member is insert-injection-molded on the door panel.

6. The airbag door of claim 1, wherein the scrim contact prevention part protrudes to the outside of the suit case.

* * * * *